US012687416B2

(12) United States Patent
Smith et al.

(10) Patent No.: US 12,687,416 B2
(45) Date of Patent: Jul. 21, 2026

(54) VOLUME DETERMINATION SYSTEM, A VEHICLE HAVING A VOLUME DETERMINATION SYSTEM, AND METHODS OF OPERATING SUCH A VEHICLE

(71) Applicant: AGCO Corporation, Duluth, GA (US)

(72) Inventors: Evan Thomas Smith, Spirit Lake, IA (US); Michael J. Runck, Jackson, IA (US)

(73) Assignee: AGCO Corporation, Duluth, GA (US)

( * ) Notice: Subject to any disclaimer, the term of this patent is extended or adjusted under 35 U.S.C. 154(b) by 435 days.

(21) Appl. No.: 18/462,808

(22) Filed: Sep. 7, 2023

(65) Prior Publication Data

US 2024/0142287 A1     May 2, 2024

Related U.S. Application Data

(60) Provisional application No. 63/381,685, filed on Oct. 31, 2022.

(51) Int. Cl.
G01F 17/00          (2006.01)

(52) U.S. Cl.
CPC .................................... G01F 17/00 (2013.01)

(58) Field of Classification Search
CPC .......... G01F 22/02; G01F 17/00; G01F 23/20; G01F 23/16
See application file for complete search history.

(56) References Cited

U.S. PATENT DOCUMENTS

| | | | |
|---|---|---|---|
| 5,630,625 A | 5/1997 | Shaw | |
| 9,079,470 B2 | 7/2015 | Slawson | |
| 11,560,031 B2 * | 1/2023 | Niedert | B60G 17/021 |
| 11,887,052 B2 * | 1/2024 | Stevenson | G07F 13/025 |
| 2010/0211356 A1 | 8/2010 | Minoshima et al. | |
| 2013/0045067 A1 | 2/2013 | Pickett et al. | |

(Continued)

FOREIGN PATENT DOCUMENTS

| | | |
|---|---|---|
| DE | 102019118149 A1 | 1/2021 |
| DE | 102019217199 A1 | 5/2021 |

(Continued)

OTHER PUBLICATIONS

UK Patent Office, Search Report for related GB Application No. GB2216576.5, dated May 9, 2023, 4 pages.

*Primary Examiner* — An H Do

(57)          ABSTRACT
A vehicle includes a holding tank having a plurality of segments, each segment configured to hold an individual product, a plurality of suspension assemblies supporting the vehicle, and a volume determination system. The volume determination system is configured to receive an indication when a first segment of the plurality of segments of the holding tank is being filled with a first product via a first filling process, responsive to an input that the first filling process of the first segment is complete, receive first pressure measurements from the plurality of suspension assemblies, based at least partially on the received first pressure measurements, determine a volume of the first product within the first segment of the plurality of segments of the holding tank, and cause the determined volume of the first product within the first segment of the plurality of segments to be output to an operator of the vehicle.

13 Claims, 9 Drawing Sheets

(56)         References Cited

U.S. PATENT DOCUMENTS

2013/0120579  A1      5/2013  Mlitsuta et al.
2020/0211356  A1      7/2020  Sporer
2022/0373384  A1      11/2022  Spendlove et al.

FOREIGN PATENT DOCUMENTS

EP             2275287  A2      1/2011
EP             2532220  A1      12/2012
JP             H0261717  B2      1/1990
WO             2017182768  A1      10/2017
WO             2022175769  A1      8/2022

* cited by examiner

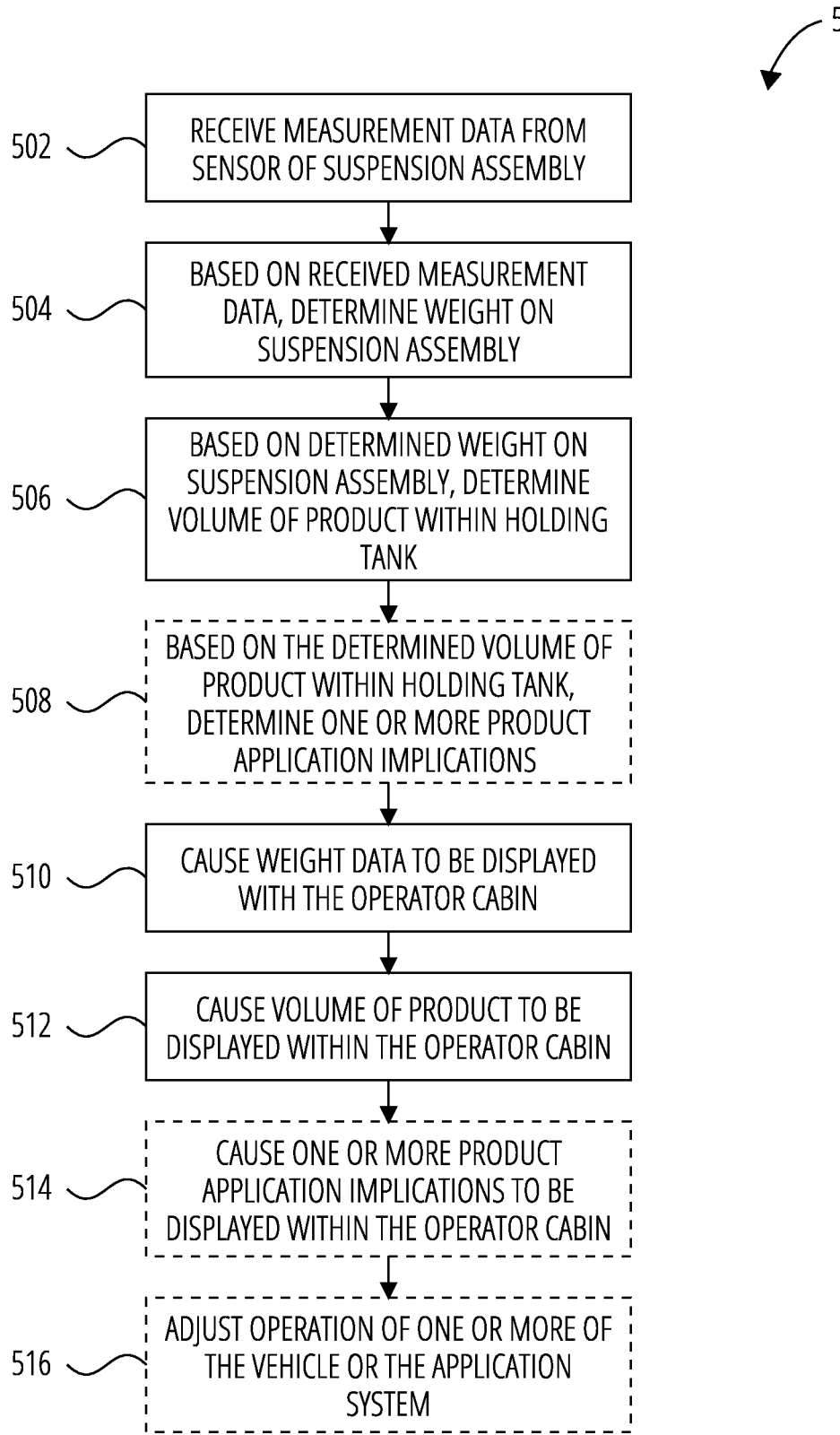

502 — RECEIVE MEASUREMENT DATA FROM SENSOR OF SUSPENSION ASSEMBLY

504 — BASED ON RECEIVED MEASUREMENT DATA, DETERMINE WEIGHT ON SUSPENSION ASSEMBLY

506 — BASED ON DETERMINED WEIGHT ON SUSPENSION ASSEMBLY, DETERMINE VOLUME OF PRODUCT WITHIN HOLDING TANK

508 — BASED ON THE DETERMINED VOLUME OF PRODUCT WITHIN HOLDING TANK, DETERMINE ONE OR MORE PRODUCT APPLICATION IMPLICATIONS

510 — CAUSE WEIGHT DATA TO BE DISPLAYED WITH THE OPERATOR CABIN

512 — CAUSE VOLUME OF PRODUCT TO BE DISPLAYED WITHIN THE OPERATOR CABIN

514 — CAUSE ONE OR MORE PRODUCT APPLICATION IMPLICATIONS TO BE DISPLAYED WITHIN THE OPERATOR CABIN

516 — ADJUST OPERATION OF ONE OR MORE OF THE VEHICLE OR THE APPLICATION SYSTEM

VOLUME DETERMINATION SYSTEM, A VEHICLE HAVING A VOLUME DETERMINATION SYSTEM, AND METHODS OF OPERATING SUCH A VEHICLE

CROSS-REFERENCE TO RELATED APPLICATION

This application claims the benefit of the filing date of U.S. Provisional Patent Application 63/381,685, filed Oct. 31, 2021, the entire disclosure of which is incorporated herein by reference.

FIELD

Embodiments of the present disclosure relate to mobile machines, such as self-propelled agricultural machines and similar vehicles.

BACKGROUND

Some vehicles are configured to be operated in fields among row crops. Application machines such as self-propelled sprayers, for example, may have a holding tank for holding a product to be applied to crops and a boom that extends outwardly from the vehicle to apply the product to the crop as the machine travels through the field. While filling the holding tank with a product and during an application process (e.g., a fertilizing process), it is often difficult to ascertain an amount of product actually within the holding tank. This can result in operators running out of product prior to finishing an application process and/or an operator overfilling the holding tank and leaving excess product in the holding tank post an application process. Accordingly, time is often wasted on hailing tender trucks too soon or too late during an application process. Moreover, safety concerns arise when too much product is loaded into the holding tank of the vehicle.

BRIEF SUMMARY

Embodiments include a vehicle having a holding tank that includes a plurality of segments, each segment configured to hold an individual product. The vehicle also includes a plurality of suspension assemblies supporting the vehicle, at least one processor, and at least one non-transitory computer-readable storage medium storing instructions thereon that, when executed by the at least one processor, cause the volume determination system to receive an indication when a first segment of the plurality of segments of the holding tank is being filled with a first product via a first filling process, responsive to an input that the first filling process of the first segment is complete, receive first pressure measurements from the plurality of suspension assemblies, based at least partially on the received first pressure measurements, determine a volume of the first product within the first segment of the plurality of segments of the holding tank, and cause the determined volume of the first product within the first segment of the plurality of segments to be output to an operator of the vehicle.

The volume determination system may further include instructions that, when executed by the at least one processor, cause the volume determination system to receive an indication when a second segment of the plurality of segments of the holding tank is being filled with a second product via a second filling process, responsive to an input that the second filling process of the second segment is complete, receive second pressure measurements from the plurality of suspension assemblies, based at least partially on the received second pressure measurements, determine a volume of the second product within the second segment of the plurality of segments of the holding tank, and cause the determined volume of the second product within the second segment of the plurality of segments to be output to the operator of the vehicle.

The volume determination system may further include instructions that, when executed by the at least one processor, cause the volume determination system to receive usage data related to an application of the first product during an application process.

The vehicle may also include an operator cabin, and wherein causing the determined volume of the first product within the first segment of the plurality of segments to be output to the operator of the vehicle includes causing the determined volume of the first product within the first segment of the plurality of segments to be displayed on a display panel of the operator cabin.

Each suspension assembly of the plurality of suspension assemblies may include at least one suspension cylinder mounted between a chassis and a respective wheel of the vehicle, a hydraulic fluid, a pump for pressuring the hydraulic fluid within the at least one suspension cylinder, and at least one pressure sensor interfacing with the hydraulic fluid and operably coupled to the volume determination system.

The volume determination system may further include instructions that, when executed by the at least one processor, cause the volume determination system to receive pressure measurement prior to the first filling process.

Determining the volume of the first product within the first segment of the plurality of segments of the holding tank of the vehicle may include determining the volume of the first product within the first segment of the holding tank of the vehicle based at least partially on a known density of the first product.

The volume determination system may further include instructions that, when executed by the at least one processor, cause the volume determination system to adjust operation of the vehicle based at least partially on the determined volume of the first product within the first segment of the plurality of segments of the holding tank.

The volume determination system may further include instructions that, when executed by the at least one processor, cause the volume determination system to provide volume data to a remote device.

The volume determination system may further include instructions that, when executed by the at least one processor, cause the volume determination system to a determine an area over which the first product can be applied based at least partially on the determined volume of the first product within the first segment of the plurality of segments of the holding tank.

Receiving usage data related to the application of the first product may include receiving data related to at least one of a time period for which the first product has been applied or an application rate at which the first product has been applied.

The volume determination system may further include instructions that, when executed by the at least one processor, cause the volume determination system to receive third pressure measurements from the plurality of suspension assemblies after the application of the first product.

The volume determination system may further include instructions that, when executed by the at least one processor, cause the volume determination system to update the determined volume of the first product based at least partially on the received third pressure measurements and the received usage data related to the application of the first product.

Embodiments also include a method that includes receiving an indication that a first segment of a holding tank of a vehicle has been at least partially filled with a first product via a first filling process, responsive to the first filling process, receiving first pressure data from suspension assemblies of a vehicle, based at least partially on the received first pressure data, determining a volume of the first product within the first segment of the holding tank of the vehicle, and causing the determined volume of the first product to be output to an operator.

The method may also include receiving an indication that a second segment of a holding tank of a vehicle has been at least partially filled with a second product via a second filling process, responsive to the second filling process, receiving second pressure data from the suspension assemblies of a vehicle, based at least partially on the received second pressure data, determining a volume of the second product within the second segment of the holding tank of the vehicle, and causing the determined volume of the second product to be output to the operator.

Causing the determined volume of the first product to be output to the operator may include causing the determined volume of the first product to be output within an operator cabin.

Causing the determined volume of the first product to be output to the operator may include causing the determined volume of the first product to be output via a device remote from the vehicle.

The method may also include at least substantially continuously receiving updated pressure data, and at least substantially continuously updating the determined volume of the first product.

Causing the determined volume of the first product to be output to the operator may include causing the determined volume of the first product to be displayed on a display panel and to be associated with the first segment of the holding tank on the display panel.

Embodiments further include a volume determination system that includes at least one processor and at least one non-transitory computer-readable storage medium storing instructions thereon that, when executed by the at least one processor, cause the volume determination system to receive at least one indication that at least one segment of a holding tank of a vehicle has been at least partially filled with a respective product, responsive to receiving the at least one indication, receive a pressure measurement from at least one suspension assembly of a vehicle, based at least partially on the received pressure measurement, determine a volume of the respective product within the at least one segment of the holding tank of the vehicle, and cause the determined volume of the respective product to be output to an operator of the vehicle. Other technical features may be readily apparent to one skilled in the art from the following figures, descriptions, and claims.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

While the specification concludes with claims particularly pointing out and distinctly claiming what are regarded as embodiments of the present disclosure, various features and advantages may be more readily ascertained from the following description of example embodiments when read in conjunction with the accompanying drawings, in which:

FIG. 5 shows a flowchart of a method of controlling operation of a vehicle according to embodiments of the disclosure;

DETAILED DESCRIPTION

Figure 1A:
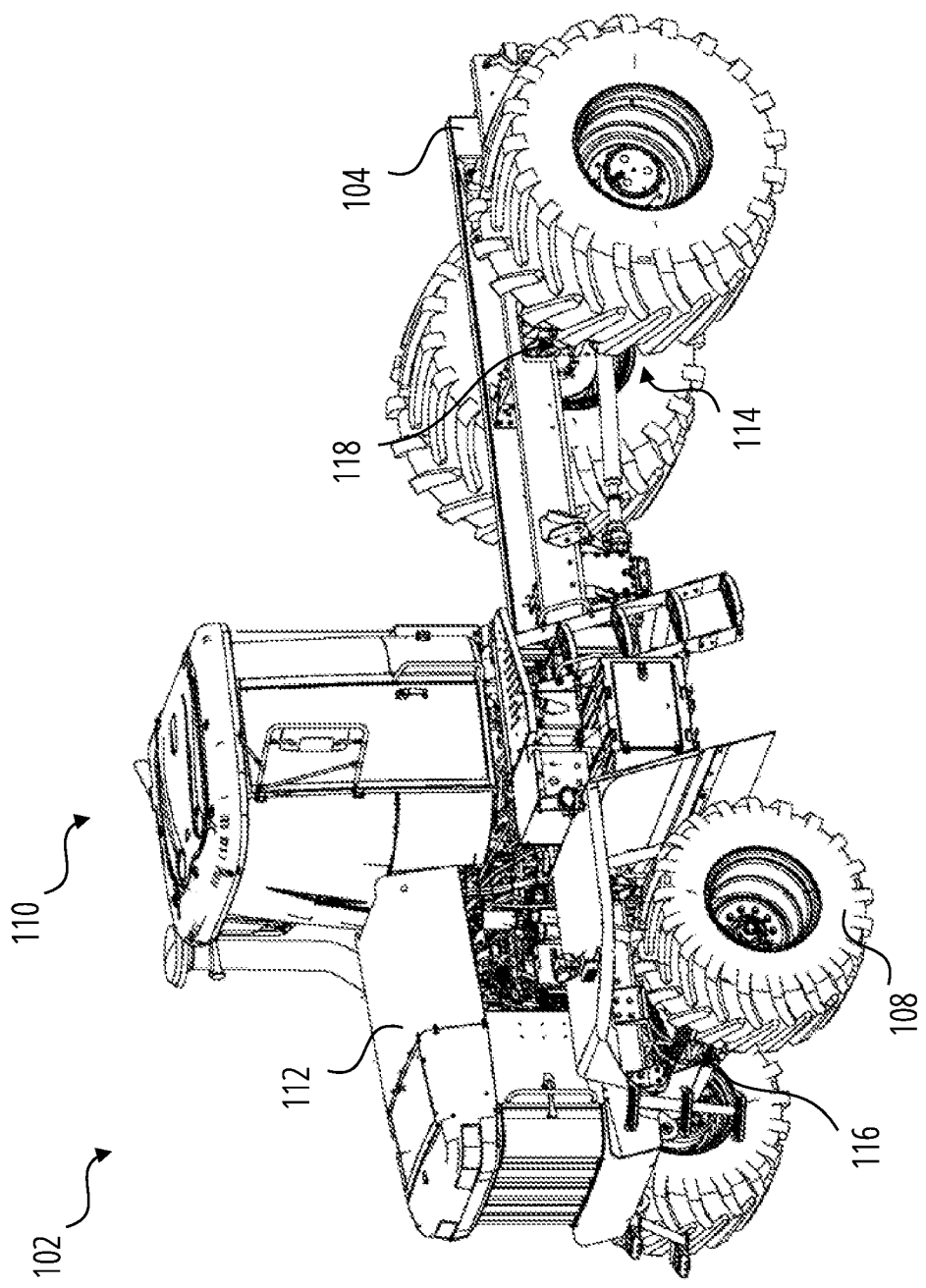
FIG. 1A shows a perspective view of a vehicle having a product volume determination system according to embodiments of the disclosure.

Illustrations presented herein are not meant to be actual views of any particular vehicle, application system, agricultural implement, component, or system, but are merely idealized representations that are employed to describe embodiments of the disclosure. Additionally, elements common between figures may retain the same numerical designation for convenience and clarity.

The following description provides specific details of embodiments. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all the elements that form a complete structure or assembly. Only those process acts and structures necessary to understand the embodiments of the disclosure are described in detail below. Additional conventional acts and structures may be used. The drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the singular forms following "a," "an," and "the" are intended to include the plural forms as well, unless the context clearly indicates otherwise.

As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, any relational term, such as "first," "second," "third," etc. is used for clarity and convenience in understanding the disclosure and accompanying drawings, and does not connote or depend on any specific preference or order, except where the context clearly indicates otherwise.

As used herein, the term "substantially" in reference to a given parameter, property, or condition means and includes to a degree that one skilled in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter, as well as variations resulting from manufacturing tolerances, etc.).

As used herein, the term "and/or" includes any and all combinations of one or more of the associated listed items.

Embodiments include a vehicle (e.g., an applicator) for distributing a product over a soil surface and/or a crop within a field. As used herein, the term "product" refers to any solid material (e.g., dry material) and/or liquid that can be or is typically applied to (e.g., distributed on) a field and/or crop during an agricultural process. The vehicle may include a volume determination system as part of a central controller of the vehicle and/or part of a remote device (e.g., a central server) in communication with the central controller of the vehicle. The volume determination system may utilize pressure measurement data received or acquired from suspension assemblies of the vehicle to determine a weight of a product and a volume of the product within a holding tank of the vehicle. Furthermore, the volume determination system may cause the determined weight of the product and/or the determined volume of the product to be output (e.g., communicated) to an operator.

Embodiments include a holding tank having multiple discrete segments for holding individual (e.g., respective) products. The volume determination system may be further configured to determine the weight and/or volume of products within the individual segments of the holding tank and cause the determined weight of the products and/or the determined volume of the products of the individual segments to be output to an operator.

The vehicle and volume determination system of the disclosure may provide advantages over conventional vehicles with application systems and/or applicators for applying a product to a field or a crop. For example, during a refill process, the volume determination system described herein enables an operator to know when enough product has been loaded within a holding tank to cover a given application process (e.g., a remaining number of acres). Furthermore, during an application process, the volume determination system enables an operator to know, from an operator cabin of the vehicle, whether the holding tank has enough product remaining to cover the given application process (e.g., a remaining number of acres).

Moreover, prior to road travel, the volume determination system enables the operator to know if whether the vehicle is too heavy to travel on roadways and/or across a given bridge. Likewise, knowing the weight on axles of the vehicle may assist with on-road operations and enable the operator to determine whether the vehicle is within compliance with roadway regulations.

Additionally, knowing a volume and/or weight of product remaining in a holding tank of a vehicle allows the operator to optimize logistics of tender trucks by avoiding having tender trucks wait for the operator to finish a current application process (e.g., field) before knowing whether the holding tank has enough product remaining. Furthermore, knowing a volume and/or weight of product remaining in a holding tank of a vehicle allows the operator to send and/or hail a tender truck to refill if the holding tank does not have enough remaining product for the current application process. Moreover, knowing a volume and/or weight of product remaining in a holding tank of a vehicle allows the operator to send an en-route tender truck to another vehicle (e.g., another field) if additional product is not needed in order to finish a current application process. Likewise, knowing a volume and/or weight of product remaining in a holding tank of a vehicle allows the operator to divert a truck en-route to another vehicle (e.g., another field) to the vehicle itself if additional product is required to finish a current application process.

Moreover, knowing a volume and/or weight of product remaining in a holding tank of a vehicle encourages an operator to only load enough product into the holding tank to accomplish (e.g., complete) a current application process. As a result, the operator may avoid being overweight with excess product when transferring to a subsequent application process (e.g., travelling to a next field). Additionally, reducing excess product in the holding tank may result is lower fuel consumption, which leads to cost savings and lower emissions.

Additionally, tires, brakes, and other vehicle components are not typically designed to support a vehicle operating at a maximum road speed with holding tanks full of product. The volume determination system may limit maximum speeds of a vehicle based on a determined volume and/or weight of product in a holding tank of the vehicle in order to prevent overloading components and/or prevent unsatisfactory braking performance.

Furthermore, often self-propelled fertilizer applicators switch an application system mounted on the chassis between liquid and dry fertilizer systems seasonally. The volume determination system of the disclosure would be equally applicable and effective for both systems without requiring unique hardware for each system. Additionally, the volume determination system of the disclosure may help to protect the vehicle from unsafe weights or speeds if an owner operates or modifies the vehicle in a manner detrimental to safety.

Figure 1B:
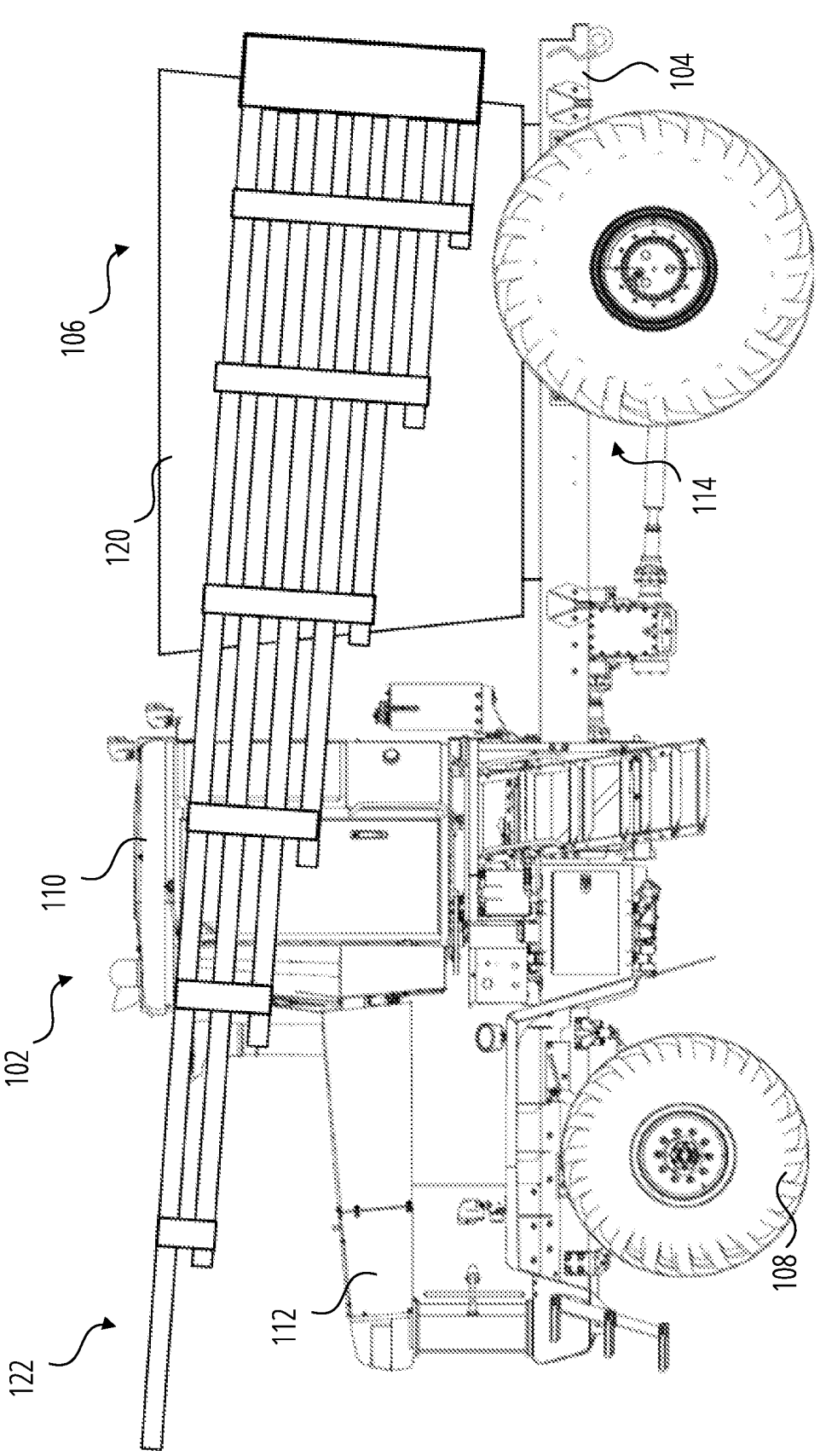
FIG. 1B shows a side view the vehicle of FIG. 1A.

FIG. 1A is a perspective view of a vehicle 102 (e.g., an applicator) according to embodiments of the disclosure. The vehicle 102 includes a system for determining a volume and/or weight of a product within a holding tank of the vehicle 102. The system 216 (FIG. 2) may be referred to herein as a "volume determination system 216." FIG. 1B is a side view of the vehicle 102 of FIG. 1A. Some components of the vehicle 102 have been omitted from FIG. 1A for simplicity of illustration and to better show features of the vehicle 102.

Referring to FIG. 1A and FIG. 1B together, the vehicle 102 may include an agricultural material applicator including a chassis 104, an application system 106, a plurality of wheels 108 or other ground-engaging elements supporting the chassis 104 above a ground surface, an operator cabin 110, and an engine compartment 112. A plurality of suspension assemblies 114 may be interposed between the wheels 108 and the chassis support of the chassis 104 and provide suspension and/or steering functions, as discussed in greater detail below. In some embodiments, the suspension assemblies 114 may further provide height adjustment. In some embodiments, the vehicle 102 may include a suspension assembly 114 for each wheel 108. In some embodiments, the vehicle 102 may include at least one suspension assembly 114 for each axle.

The vehicle 102 includes a pair of front wheels 108 coupled to a front axle 116 and a pair of rear wheels 108 coupled to a rear axle 118 of the appropriate size and shape to allow the vehicle 102 to travel among row crops with minimal crop disturbance. As used herein, a "wheel" includes an inner, rigid wheel and an outer, flexible tire mounted on the inner wheel, unless otherwise specified. The particular size, shape, and configuration of the wheels 108 may vary substantially from one embodiment to another. In some embodiments, the vehicle 102 may include ground-engaging elements other than wheels, such as tracks, skis, etc. Hereinafter, reference will be made to a "wheel 108" or "wheels 108" with the understanding that the illustrated wheels 108 may be replaced with other types of ground-engaging elements.

The application system 106 is supported on the chassis 104 and may be useful for distributing products (e.g., liquids and/or solids), such as fertilizer in a field. As shown in FIG. 1B, the application system 106 includes a holding tank 120 and a delivery system 122 for applying the product (e.g., liquids and/or solids) from the holding tank 120 to a crop or field. In embodiments where the holding tank 120 is configured to hold liquids, the holding tank 120 may have a capacity of between 200 gallons (757 I) and 2,000 gallons (7,570 I) and, more specifically, may have a capacity of 700 gallons (2,650 I), 900 gallons (3,410 I), 1,100 gallons (4,160 I), or 1,300 gallons (4,920 I). In embodiments where the holding tank 120 is configured to hold solids and includes a solid product hopper, the holding tank 120 may have a capacity of between 100 cubic feet (2.83 cubic meters) and 400 cubic feet (11.32 cubic meters). As is discussed in greater detail, data provided by the suspension assemblies 114 may be utilized to determine a volume of product (e.g., liquid and/or dry material) within the holding tank 120, which may provide useful information to an operator and may influence operation of the vehicle 102 and/or the application system 106.

In some embodiments related to liquid application, the delivery system 122 may include a laterally extending boom supporting hoses, pumps, and spray nozzles or similar components for dispersing or otherwise delivering the contents of the holding tank 120 to a crop. The boom may be configured to fold for transport. In some embodiments related to dry material application, the application system 106 may include a solid product hopper and a solid material spreader for dispersing particulate material from the solid product hopper, such as a pneumatic spreader or one or more spinners.

Figure 2:
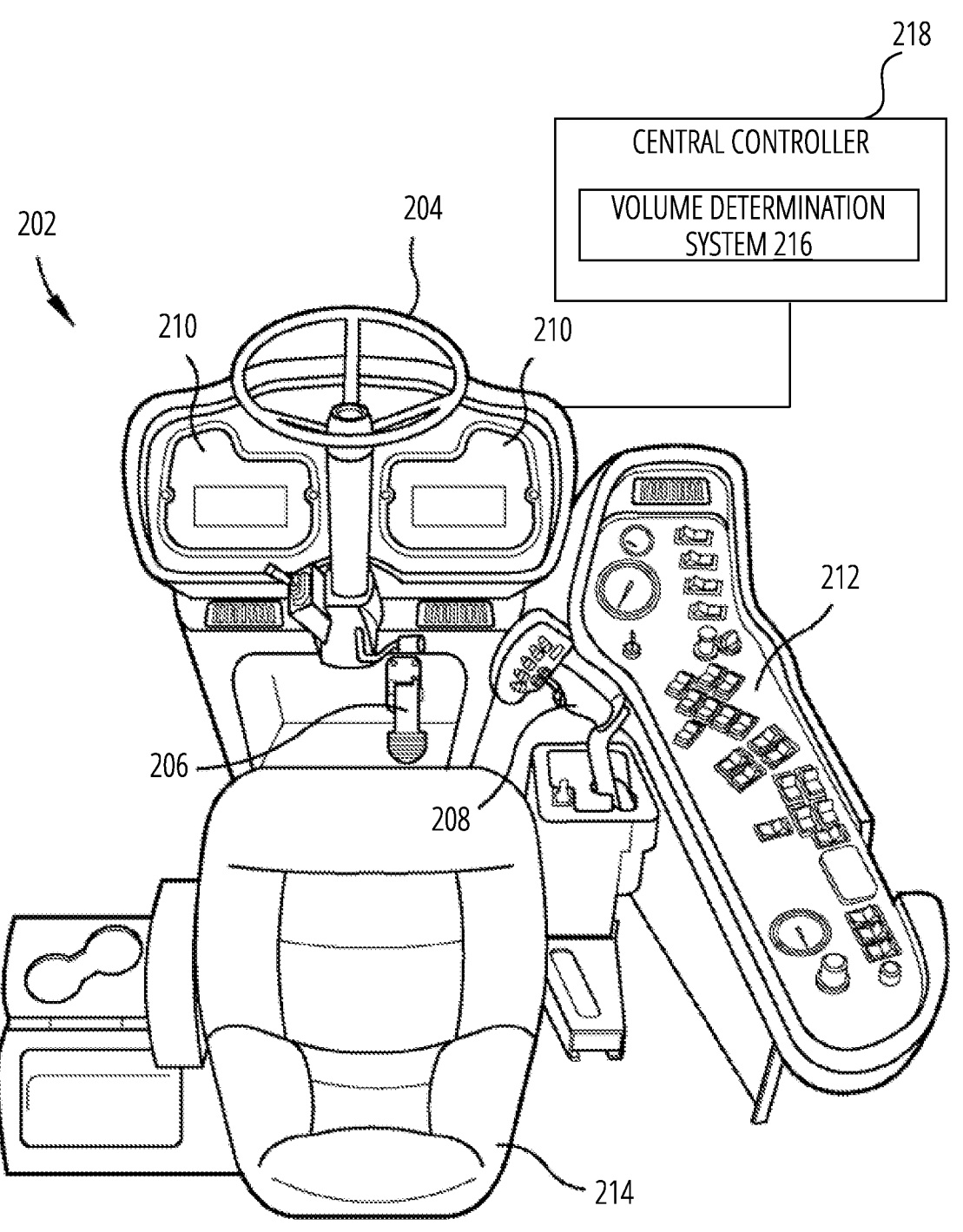
FIG. 2 shows portions of a cabin of the vehicle of FIG. 1A and FIG. 1B including one or more user interface elements allowing an operator to control the vehicle according to one or more embodiments of the disclosure.

FIG. 2 shows a simplified view of an interior of the operator cabin 110. The operator cabin 110 or "cab" is supported on the chassis 104 and may be positioned forward (as shown in FIG. 1B) of behind of the application system 106. The operator cabin 110 may include a control environment 202 which may include a steering wheel 204, one or more pedals 206, a drive lever 208, one or more electronic display panels 210, and a control panel 212 including buttons, switches, levers, gauges, and/or other user interface elements. The various components of the control environment 202 enable the operator to control the functions of the vehicle 102, including driving and operating the application system 106. The various user interface elements are positioned around and proximate a seat 214 for easy access by an operator during operation of the vehicle 102. In some embodiments, the control environment 202 may include a touchscreen display. For example, one or both of the electronic display panels 210 may be or include a touchscreen, or a display terminal with a touchscreen may be mounted on or near the control panel 212.

One or more elements of the control environment 202 may be operably coupled to a volume determination system 216 of a central controller 218. The central controller 218 may be configured to control one or more operations and devices of the vehicle 102 and/or the application system 106. The central controller 218 and the volume determination system 216 are described in greater detail below. The volume determination system 216 may include software and/or hardware for determining a weight and/or volume of a product within the holding tank 120 of the vehicle 102 based on pressure data received from the suspension assemblies 114 of the vehicle 102.

In some embodiments, the vehicle 102 may not include an operator cabin 110 or may include a limited operator cabin 110. As a non-limiting example, the vehicle 102 may be an autonomous machine, and the operator cabin 110 may be omitted. In such embodiments, the central controller 218 may operate the vehicle 102 and may receive at least some instructions from a remote operator or system via a wireless link. For example, the central controller 218 and the volume determination system 216 may be in communication with one or more central servers or remote devices and may receive instructions from the one or more central servers or remote devices. Moreover, the central controller 218 and the volume determination system 216 may send data (e.g., weight and/or volume data) to the one or more central servers or remote devices for display to a remote operator.

Figure 3:
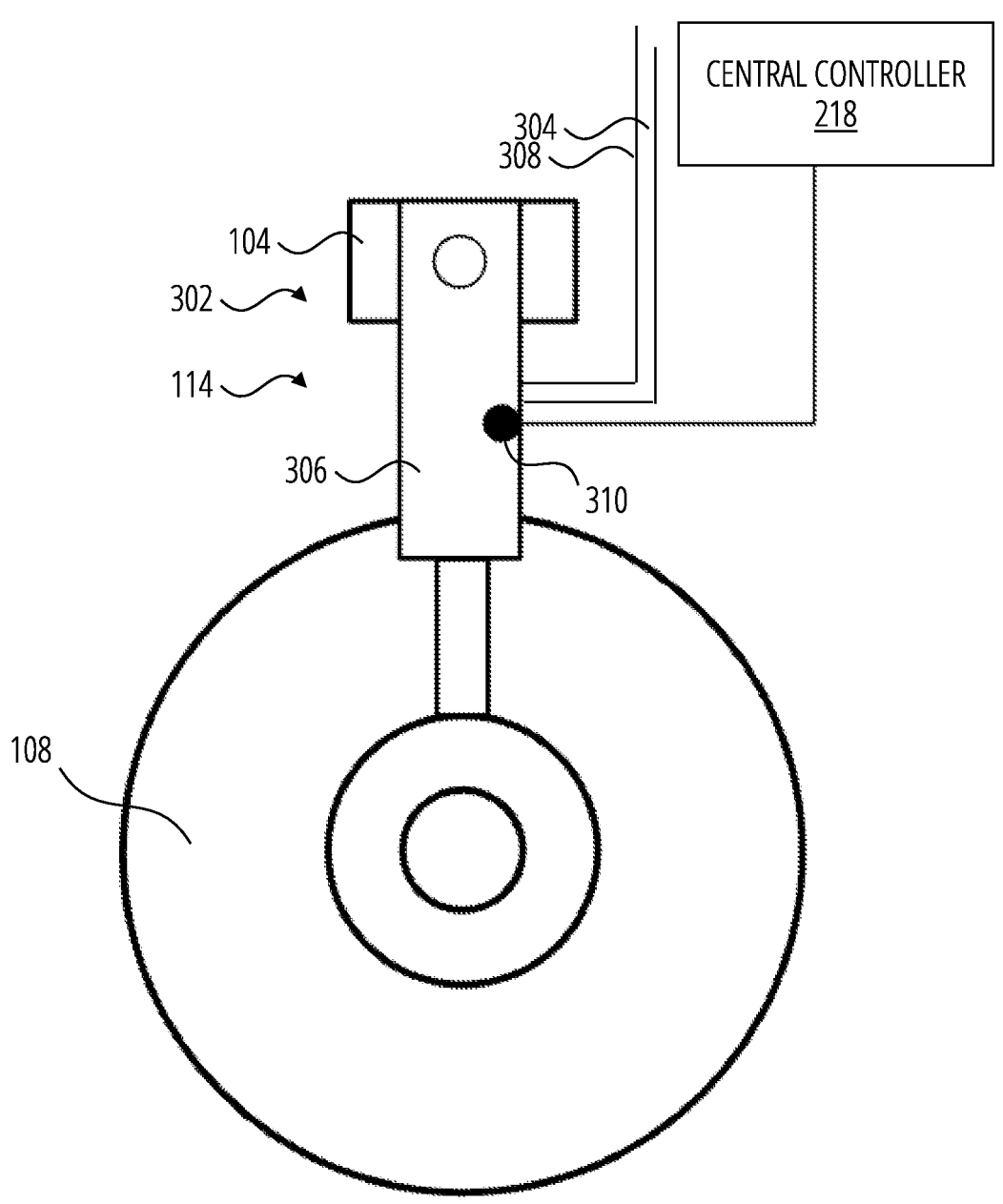
FIG. 3 shows a schematic representation of a suspension assembly of the vehicle according to one or more embodiments of the disclosure.

FIG. 3 shows a simplified view of a suspension assembly 114 of the vehicle 102 according to embodiments of the disclosure. In some embodiments, the suspension assembly 114 may include a hydraulic suspension system 302 that is mounted and interposed between the wheels 108 and the chassis support of the chassis 104. In some embodiments, the hydraulic suspension system 302 may include a pump for pressurizing a hydraulic fluid 304, at least one suspension cylinder 306, and one or more hydraulic lines 308 extending between the pump and the suspension cylinder 306. The suspension cylinder 306 may include a conventional suspension cylinder having a piston and a piston guide and may operate in conventional manners. The suspension assembly 114 may further include at least one pressure sensor 310 interfacing with the hydraulic fluid 304 within the hydraulic suspension system 302 and configured to measure a pressure of the hydraulic fluid 304. The at least one pressure sensor 310 may be operably coupled to the central controller 218 and may be configured to provide measurement data (e.g., pressure data) to the volume determination system 216 of the central controller 218. The at least one pressure sensor 310 may include any conventional pressure sensor or transducer, such as a piezo-resistive pressure sensor, a strain-gauge-based pressure sensor, or a capacitive pressure sensor.

While the suspension assembly 114 depicted in FIG. 3 only includes one suspension cylinder in a vertical orientation for simplicity, the disclosure is not so limited. Rather, the suspension assembly 114 may include multiple suspension cylinders each orientated in any orientation, and the at least one pressure sensor 310 may include multiple sensors. Furthermore, the suspension cylinders may be mounted via any known manners. As a non-limiting example, the suspension assembly 114 may include any of the support assemblies described in U.S. Pat. No. 9,079,470 B2, to Slawson, issued Jul. 14, 2015.

Referring still to FIG. 3, in some embodiments, the suspension assembly 114 may include a pneumatic suspension system including a pump and/or compressor and bellows. For example, the suspension assembly 114 may include any conventional vehicle pneumatic suspension system that utilizes a gas instead of a hydraulic fluid. In such embodiments, the at least one pressure sensor 310 may include a piezo-resistive pressure sensor, a strain-gauge-based pressure sensor, a capacitive pressure sensor, or a solid-state pressure sensor.

Figure 4:
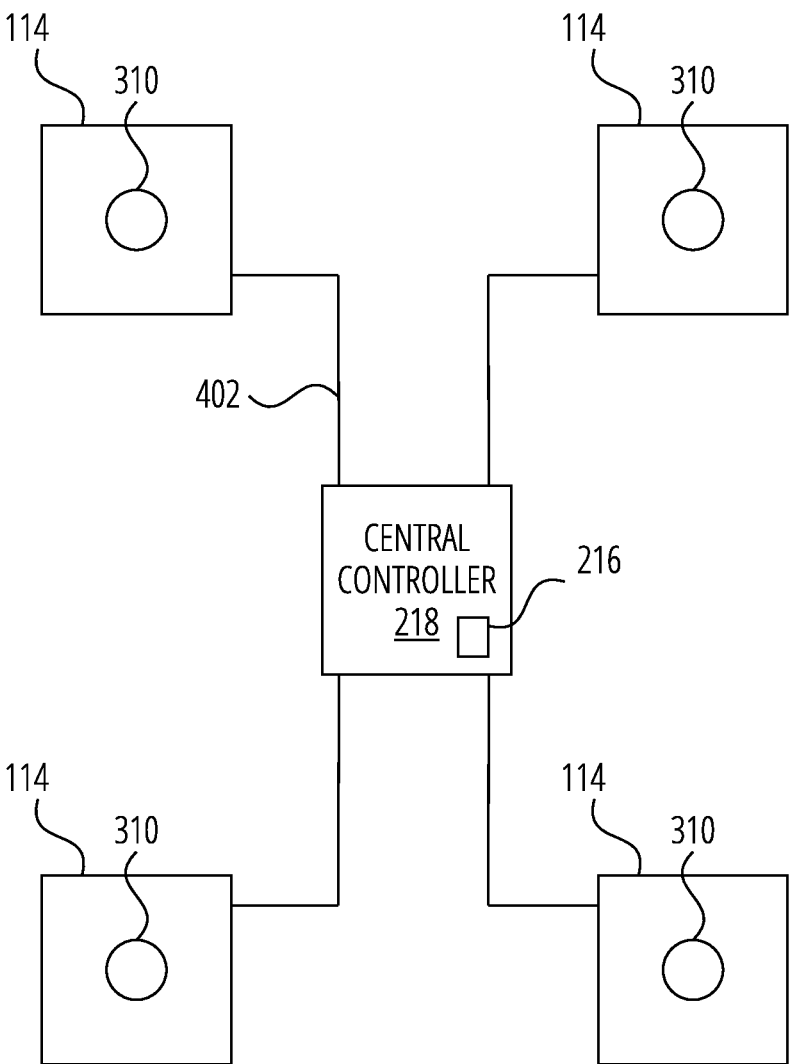
FIG. 4 shows a schematic representation of suspension assemblies and a central controller of the vehicle according to one or more embodiments of the disclosure.

FIG. 4 is a schematic of the central controller 218 having the volume determination system 216 and operably coupled to the suspension assemblies 114 of the vehicle 102. As depicted in FIG. 4, each of the suspension assemblies 114 of the vehicle 102 is operably coupled to the central controller 218 and, as a result, the volume determination system 216 via one or more communication lines 402. Furthermore, the pressure sensors 310 are configured to provide the measurement data to the volume determination system 216 of the central controller 218 via the communication lines 402. FIG. 5 is a flowchart of a method 500 of operating a vehicle 102 with an application system 106 according to embodiments of the disclosure. As a non-limiting example, the method 500 may be performed subsequent to the holding tank 120 of the vehicle 102 being filled with a product and/or anytime during an application process (e.g., application of fertilizer) to determine an amount of product remaining in the holding tank 120 of the vehicle 102.

The method 500 may include receiving measurement data from the at least one pressure sensor 310 of the suspension assembly 114 of the vehicle 102, as shown in act 502 of FIG. 5. In some embodiments, the volume determination system 216 of the central controller 218 may receive the measurement data from the at least one pressure sensor 310 of the suspension assembly 114. In some embodiments, receiving measurement data may include receiving measurement data from suspension assemblies 114 of each axle of the vehicle 102 (e.g., the front axle 116 and the rear axle 118 of the vehicle 102). In some embodiments, receiving measurement data may include receiving measurement data from suspension assemblies 114 coupled to each wheel 108 of the vehicle 102. For instance, the volume determination system 216 of the central controller 218 may receive measurement data from at least three or at least four suspension assemblies 114.

In some embodiments, the measurement data may include data indicating a pressure (e.g., hydraulic or pneumatic pressure reading). For instance, in some embodiments, the measurement data may include an electrical signal that is filtered by the volume determination system 216 of the central controller 218 to determine a pressure measurement.

Based at least partially on the received measurement data, the method 500 may include determining a weight of the product within the holding tank 120, as shown in act 504 of FIG. 5. In some embodiments, the volume determination system 216 of the central controller 218 may determine the weight of the product within the holding tank 120. In some embodiments, the weight of the product may be determined based at least partially on known pressure measurements (e.g., pressure readings) of the at least one pressure sensor 310 when the holding tank 120 is empty (pressure measurements when empty) and the received measurement data when the holding tank 120 is loaded with the product. For instance, the weight of the product may be determined based on pressure differentials between pressure measurements when the holding tank 120 is empty and pressure measurements when the holding tank 120 contains the product. The weight may further be determined based at least partially on known geometry (e.g., surface areas of piston heads) of the suspension assemblies 114 and the pressure measurements.

In some embodiments, determining a weight of the product within the holding tank 120 may also include determining a weight on each axle of the vehicle 102 and/or determining a weight on each suspension assembly 114 of the vehicle 102.

The method 500 may further include, based at least partially on the determined weight of the product within the holding tank 120, determining a volume of the product within the holding tank 120, as shown in act 506 of FIG. 5. In some embodiments, the volume of the product within the holding tank 120 may be determined by the volume determination system 216 of the central controller 218. The volume of the product may be determined based on the determined weight of the product and a known density ($\rho$) of the product. For instance, the mass (m) of the product may be determined via $m=w/g$ where w is the weight of the product and g is the acceleration of gravity. The volume may be determined via $V=m/\rho$.

Additionally, the method 500 may optionally include determining one or more product application implications (e.g., results, consequences, etc.) based at least partially on the determined volume of the product within the holding tank 120, as shown in act 508 of FIG. 5. For example, the volume determination system 216 of the central controller 218 may determine the one or more product application implications. In some embodiments, the implications may include one or more of an area that can be applied (e.g., treated, covered, fertilized, etc.) at a current application rate with a volume of product currently within the holding tank 120, a maximum recommended speed of the vehicle 102 permitted by the weight of product currently within the holding tank 120, or an amount of time remaining until a refill of product is needed (e.g., an estimated time to empty).

The method 500 may include causing weight data to be displayed within the operator cabin 110, as shown in act 510 of FIG. 5. For example, the volume determination system 216 of the central controller 218 may cause the weight data to be displayed within operator cabin 110. The weight data may include one or more of a current weight of product within the holding tank 120, a weight on each axle of the vehicle 102, or a weight on each suspension assembly 114. The weight data may be displayed on one or more of the electronic display panels 210 of the control environment 202 of the operator cabin 110. In some embodiments, the volume determination system 216 of the central controller 218 may cause the weight data to be displayed at and/or provided to a remote device (e.g., a server).

Furthermore, the method 500 may include causing the determined volume of the product within the holding tank 120 to be displayed within the operator cabin 110, as shown in act 512 of FIG. 5. For example, the volume determination system 216 of the central controller 218 may cause the volume of the product to be displayed within operator cabin 110. The volume of the product may be displayed on one or more of the electronic display panels 210 of the control environment 202 of the operator cabin 110. In some embodiments, the volume determination system 216 of the central controller 218 may cause the determined volume to be displayed at and/or provided to a remote device (e.g., a server).

The method 500 may optionally include causing one or more of the determined product application implications to be displayed within the operator cabin 110, as shown in act 512 of FIG. 5. For example, the volume determination system 216 of the central controller 218 may cause the determined product application implications to be displayed within operator cabin 110. The one or more determined product application implications may include an area that can be applied (e.g., treated, covered, fertilized, etc.) at a current application rate with a volume of product currently within the holding tank 120, a maximum recommended speed of the vehicle 102 permitted by the weight of product currently within the holding tank 120, and/or a an amount of time remaining until a refill of product is needed (e.g., a time to empty). The one or more determined product application implications may be displayed on one or more of the electronic display panels 210 of the control environment 202 of the operator cabin 110. In some embodiments, the volume determination system 216 of the central controller 218 may cause one or more of the determined product application implications to be displayed at and/or provided to a remote device (e.g., a server).

Referring still to FIG. 5, act 502 through act 514 may be iteratively or at least substantially continuously repeated. As a result of the foregoing, data displayed within the operator cabin 110 may be iteratively or at least substantially continuously updated. Moreover, the data displayed at and/or provided to a remote device (e.g., a server) may be iteratively or at least substantially continuously updated.

Additionally, the method 500 may optionally include adjusting operation of one or more of the vehicle 102 or the application system 106 based at least partially on the determined volume and/or weight of the product within the holding tank 120, as shown in act 516 of FIG. 5. For example, the central controller 218 may adjust operation of one or more of the vehicle 102 or the application system 106 based at least partially on the determined volume and/or weight of the product within the holding tank 120. In some embodiments, based at least partially on the determined volume and/or weight of the product within the holding tank 120, the method 500 may include limiting a top speed and/or a lower speed of the vehicle 102. In some embodiments, based at least partially on the determined volume and/or weight of the product within the holding tank 120, the method 500 may include adjusting an application rate (e.g., a rate at which product is applied to a field). In some embodiments, based at least partially on the determined volume and/or weight of the product within the holding tank 120, the method 500 may include scheduling the vehicle 102 to intercept a tender truck and/or a filling station at a given time (e.g., a given time in the future).

Referring still to FIG. 5, in embodiments where the central controller 218 limits the speed of the vehicle 102 due to a weight or a volume of product within the holding tank 120 of the vehicle 102, an upper limit and/or a lower limit on speed may be at least substantially continuously changed during an application process. For example, as the product is depleted within the holding tank 120, a minimum speed and/or a maximum speed at which the vehicle 102 can travel may be at least substantially continuously changed (e.g., increased or decreased) for at least some period of time.

Limiting the maximum speed and/or the minimum speed of the vehicle 102 during an application process may minimize damage to the vehicle 102 (e.g., an engine and/or transmission of the vehicle 102) during an application process. Furthermore, limiting the speeds of the vehicle 102 during an application process may minimize damage to a soil surface and/or crops upon which the vehicle 102 is traveling.

Referring to FIG. 1A through FIG. 5 together, the volume determination system 216 and the method 500 of determining a volume of a product within a holding tank 120 of the vehicle 102 of the disclosure may provide advantages over conventional vehicles with application systems and/or applicators for applying a product to a field or a crop. For example, during a refill process, the volume determination system 216 and method 500 described herein enable an operator to know when enough product has been loaded within the holding tank 120 to cover a given application process (e.g., a remaining number of acres). Furthermore, during application, the volume determination system 216 and method 500 enable an operator to know, from the operator cabin 110, whether the holding tank 120 has enough product remaining to cover the given application process (e.g., a remaining number of acres). Additionally, knowing a volume of product remaining within the holding tank 120 assists an operator with in-field operations and logistics of planning for tender trucks. Moreover, prior to road travel, the volume determination system 216 enables the operator to know whether the vehicle 102 is too heavy to travel on roadways and/or across a given bridge. Likewise, knowing the weight on the axles of the vehicle 102 will assist with on-road operations and enable the operator to determine whether the vehicle 102 is within compliance with roadway regulations.

Additionally, knowing a volume and/or weight of product remaining in a holding tank 120 of a vehicle 102 allows the operator to optimize logistics of tender trucks by avoiding having tender trucks wait for the operator to finish a current application process (e.g., field) before knowing whether the holding tank 120 has enough product remaining. Furthermore, knowing a volume and/or weight of product remaining in a holding tank 120 of a vehicle 102 allows the operator to send and/or hail a tender truck to refill if the holding tank 120 does not have enough remaining product for the current application process. Moreover, knowing a volume and/or weight of product remaining in a holding tank 120 of a vehicle 102 allows the operator to send an en-route tender truck to another vehicle (e.g., another field) rather than the vehicle 102 if additional product is not needed in order to finish a current application process. Likewise, knowing a volume and/or weight of product remaining in a holding tank 120 of a vehicle 102 allows the operator to divert a truck en-route to another vehicle (e.g., another field) to the vehicle 102 instead if additional product is required to finish a current application process.

Figure 6:
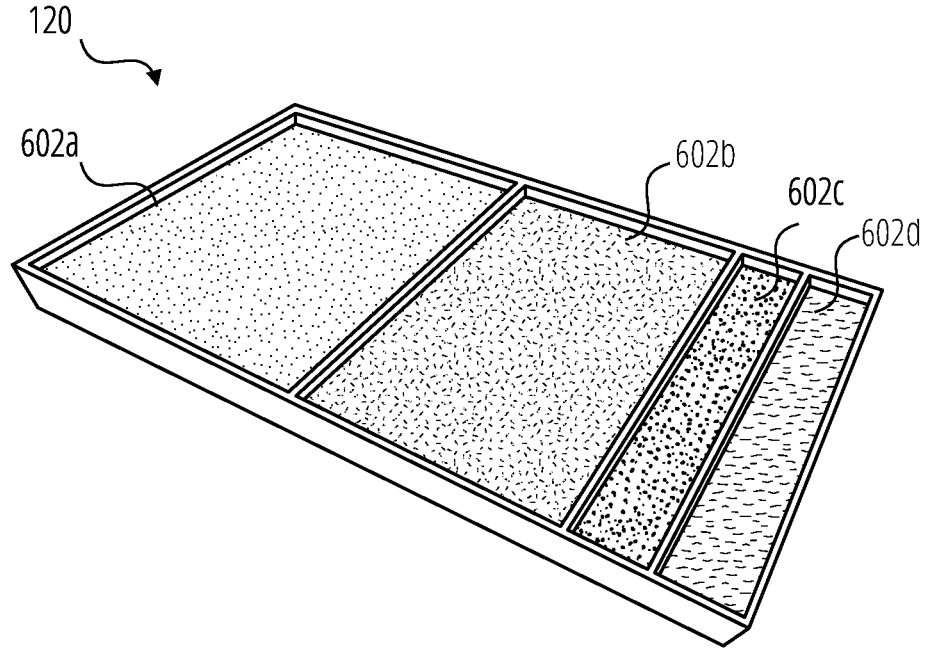
FIG. 6 shows a holding tank according to embodiments of the disclosure.

FIG. 6 shows a perspective view of a holding tank 120 according to one or more embodiments of the disclosure. In some embodiments, the holding tank 120 may include a plurality of discrete segments 602a-602d (referred to herein collectively as "602a"). Each segment 602a of the holding tank 120 may be configured to hold an individual product. For example, the segments 602a may be configured to hold one or more of fertilizer, soil amendments, weed killer, or any other product that can be or is typically applied to (e.g., distributed on) a field and/or crop during an agricultural process. Although the holding tank 120 if FIG. 6 is depicted as holding solid materials (e.g., as a solid material hopper), the disclosure is not so limited, and the holding tank 120 may include a liquid holding tank 120 with a plurality of segments 602a for holding individual liquids. In some embodiments, the holding tank 120 may include both segments 602a for solid materials and segments 602a for holding liquids.

Figure 7:
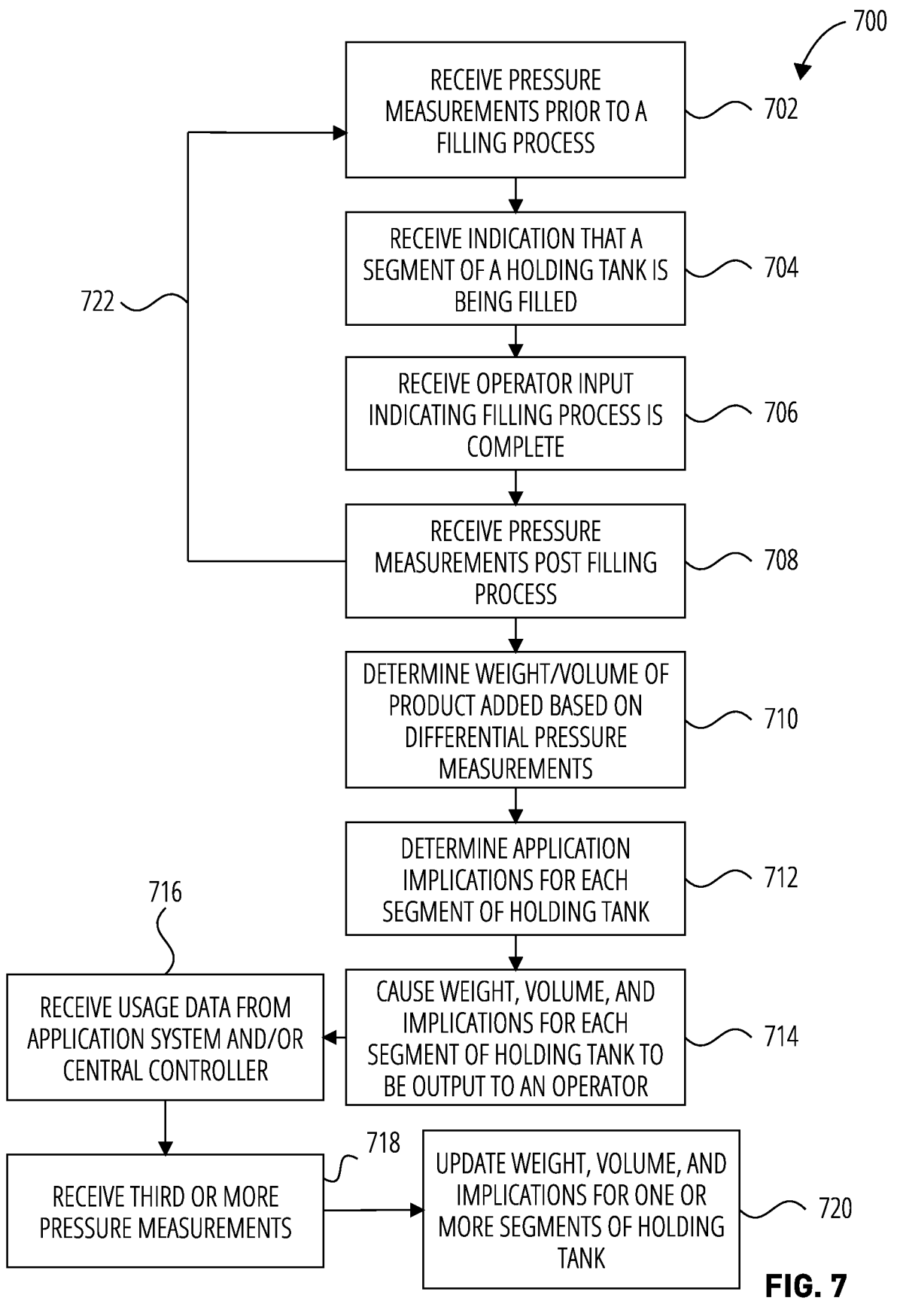
FIG. 7 shows a flowchart of a method of monitoring contents of a holding tank of a vehicle according to embodiments of the disclosure.

FIG. 7 shows a flowchart of a method 700 of monitoring contents of a holding tank 120 of a vehicle 102 according to embodiments of the disclosure. The method 700 may include receiving first pressure measurements from suspension assemblies 114 of the vehicle 102 having the holding tank 120 prior to a filling (e.g., a loading) process where product is added to one or more segments 602a of the holding tank 120, as shown in act 702 of FIG. 7. For example, the volume determination system 216 may receive the first pressure measurements via any of the manners described above in regard to FIG. 5.

The method 700 may also include receiving an indication that a segment 602a of the holding tank 120 is being filled or has been at least partially filled by the filling process, as shown in act 704 of FIG. 7. In some embodiments, the indication may include an operator input received via the operator cabin 110. For example, the operator input may be received via one or more of the user interface elements and/or the one or more electronic display panels 210 of the operator cabin 110. In some embodiments, the volume determination system 216 may receive the operator input. In additional embodiments, the operator input may be received at a remote device and then provided to the volume determination system 216 via a wireless communication.

In additional embodiments, the indication may include data from one or more sensors of the holding tank 120 and may be received from the one or more sensors of the holding tank 120. For instance, the one or more sensors of the holding tank 120 may sense product being added to the holding tank 120 and may provide data to the volume determination system 216.

In some embodiments, when the indication includes an operator input, the operator input may include a selection of at least one segment 602a of the holding tank 120 that is being filled or has been filled by the filling process. Furthermore, the operator input may include a selection of a product with which the selected at least one segment 602a is being filled or has been filled. In further embodiments, when the indication includes data received from one or more sensors of the holding tank 120, the received data may indicate which segment is being filled or has been filled by the filling process or may be associated with the segment that is being filled or has been filled by the filling process.

Additionally, the method 700 may include receiving an operator input indicating that the filling process is complete, as shown in act 706 of FIG. 7. In some embodiments, the volume determination system 216 may receive the operator input. Furthermore, in some embodiments, the operator input may be received via one or more of the user interface elements or the one or more electronic display panels 210 of the operator cabin 110. In additional embodiments, the operator input may be received at a remote device and then provided to the volume determination system 216 via a wireless communication.

The method 700 may further include, responsive to receiving an indication that the filling process is complete, receiving second pressure measurements from suspension assemblies 114 of the vehicle 102 having the holding tank 120, as shown in act 708 of FIG. 7. For example, the volume determination system 216 may receive the second pressure measurements via any of the manners described above in regard to FIG. 5. Referring to act 704 and act 706 together, in some embodiments, the operator input indicating the filling process in complete may include an operator input initiating the second pressure measurements.

As shown in FIG. 7, the method 700 may include repeating act 702 through act 708 for any number of segments 602a of the holding tank 120.

Furthermore, the method 700 may include determining a weight and/or a volume of product added to the selected at least one segment 602a during the filling process based on differential pressure measurements between the first pressure measurements and the second pressure measurements, as shown in act 710 of FIG. 7. For instance, the weight and/or the volume of the product added to the selected at least one segment 602a may be determined via any of the manners described above in regard to FIG. 5.

Moreover, the method 700 may include determining application implications (e.g., results, consequences, etc.) for each segment 602a of the holding tank 120 based at least partially on the determined volumes of products within each segment 602a of the holding tank 120 as shown in act 712 of FIG. 7. The application implications may be determined via any of the manners described above in regard to FIG. 5. Furthermore, the application implications may include one or more of an area that can be applied (e.g., treated, covered, fertilized, etc.) at a current application rate with a volume of product currently within a given segment 602a of the holding tank 120 or an amount of time remaining until a refill of product is needed (e.g., an estimated time to empty) for a given segment 602a of the holding tank 120.

The method 700 may also include causing the determined weight, the determined volume, and/or any of the determined application implications for each segment 602a of the holding tank 120 to be output to an operator, as shown in act 714 of FIG. 7. For instance, the volume determination system 216 may cause the determined weight, the determined volume, and/or any of the determined application implications for each segment 602a of the holding tank 120 to be output to an operator via any of the manners described above in regard to FIG. 5. As a non-limiting example, the volume determination system 216 may cause the determined weight, the determined volume, and/or any of the determined application implications for each segment 602a of the holding tank 120 to be output to an operator via one or more of the display panels 210 of the operator cabin 110 of the vehicle 102. Furthermore, causing the determined weight, the determined volume, and/or any of the determined application implications for each segment 602a of the holding tank 120 to be output to an operator may include associating the determined weight, the determined volume, and/or any of the determined application implications for each segment 602a within the output (e.g., within the display panel 210 of the operator cabin 110).

Also, the method 700 may optionally include receiving usage data from the application system 106 and/or the central controller 218 of the vehicle 102, as shown in act 716 of FIG. 7. For example, the volume determination system 216 may receive the usage data from the application system 106 and/or the central controller 218. In some embodiments, the usage data may include one or more of when (e.g., a start and stop time of when, a time period for which) a given product is being applied, from which segment 602a a given product is being applied, or an application rate at which the product is being applied or was applied.

Additionally, the method 700 may optionally include receiving third or more pressure measurements from suspension assemblies 114 of the vehicle 102 having the holding tank 120, as shown in act 718 of FIG. 7. For example, the volume determination system 216 may receive the second pressure measurements via any of the manners described above in regard to FIG. 5. In some embodiments, the method 700 may include iteratively or at least substantially continuously receiving pressure measurements from suspension assemblies 114 of the vehicle 102.

Moreover, the method 700 may optionally include updating one or more of a determined weight of a product of a given segment, a determined volume of a product of a given segment, or determined application implications for a product of a given segment, as shown in act 720 of FIG. 7. In some embodiments, the volume determination system 216 may update one or more of a determined weight of, a determined volume of, or determined application implications for a product of a given segment based at least partially on the received usage data and/or the received third or more pressure measurements. Furthermore, the volume determination system 216 may cause the updated weight, volume, and/or application implications to be output to an operator. In some embodiments, the updated weight, volume, and/or application implications may be output to an operator via one or more display panels 210 of the operator cabin 110.

Referring still to FIG. 7, act 702 through act 722 may be iteratively or at least substantially continuously repeated. As a result of the foregoing, data (e.g., a determined weight of, a determined volume of, or determined application implications for a product of a given segment) displayed within the operator cabin 110 may be iteratively or at least substantially continuously updated. Moreover, the data displayed at and/or provided to a remote device (e.g., a server) may be iteratively or at least substantially continuously updated.

Furthermore, method 700 may include any of the acts described above in regard to method 500 and FIG. 5. For example, method 700 may include optionally include adjusting operation of one or more of the vehicle 102 or the application system 106 based at least partially on the determined volume and/or weight of a product within a given segment 602a of the holding tank 120.

Figure 8:
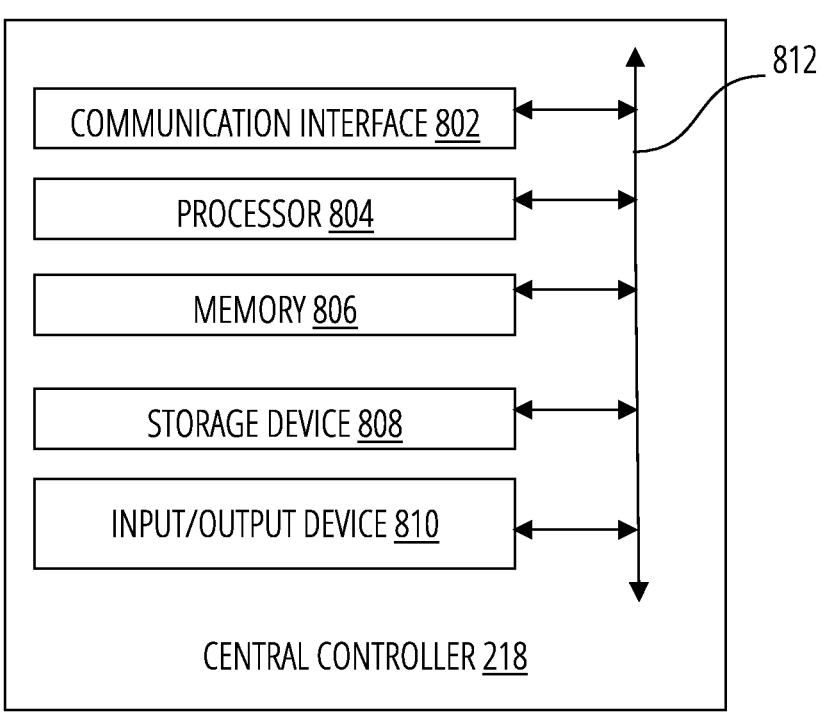
FIG. 8 is a schematic view of a central controller according to embodiments of the disclosure.

FIG. 8 is a schematic view of the central controller 218, which may at least partially operate the vehicle 102 and application system 106 according to some embodiments of the disclosure. The central controller 218 may include a communication interface 802, a processor 804, a memory 806, a storage device 808, an input/output device 810, and a bus 812.

In some embodiments, the processor 804 includes hardware for executing instructions, such as those making up a computer program. As an example, and not by way of limitation, to execute instructions, the processor 804 may retrieve (or fetch) the instructions from an internal register, an internal cache, the memory 806, or the storage device 808 and decode and execute them. In some embodiments, the processor 804 may include one or more internal caches for data, instructions, or addresses. As an example, and not by way of limitation, the processor 804 may include one or more instruction caches, one or more data caches, and one or more translation look aside buffers (TLBs). Instructions in the instruction caches may be copies of instructions in the memory 806 or the storage device 808.

The memory 806 may be coupled to the processor 804. The memory 806 may be used for storing data, metadata, and programs for execution by the processor(s). The memory 806 may include one or more of volatile and non-volatile memories, such as Random-Access Memory ("RAM"), Read-Only Memory ("ROM"), a solid state disk ("SSD"), Flash, Phase Change Memory ("PCM"), or other types of data storage. The memory 806 may be internal or distributed memory.

The storage device 808 may include storage for storing data or instructions. As an example, and not by way of limitation, storage device 808 can comprise a non-transitory storage medium described above. The storage device 808 may include a hard disk drive (HDD), Flash memory, an optical disc, a magneto-optical disc, magnetic tape, or a Universal Serial Bus (USB) drive or a combination of two or more of these. The storage device 808 may include removable or non-removable (or fixed) media, where appropriate. The storage device 808 may be internal or external to the computing storage device 808. In one or more embodiments, the storage device 808 is non-volatile, solid-state memory. In other embodiments, the storage device 808 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or Flash memory or a combination of two or more of these.

The input/output device 810 may allow an operator of the vehicle 102 102 to provide input to, receive output from, and otherwise transfer data to and receive data from central controller 218. The input/output device 810 may include a mouse, a keypad or a keyboard, a joystick, a touch screen, a camera, an optical scanner, network interface, modem, other known I/O devices, or a combination of such I/O interfaces. The input/output device 810 may include one or more devices for presenting output to an operator, including, but not limited to, a graphics engine, a display (e.g., a display screen), one or more output drivers (e.g., display drivers), one or more audio speakers, and one or more audio drivers. In certain embodiments, the input/output device 810 is configured to provide graphical data to a display for presentation to an operator. For instance, the input/output device 810 may include the display panel 210 of the operator cabin 110. The graphical data may be representative of one or more graphical user interfaces and/or any other graphical content as may serve a particular implementation. As is described above, the central controller 218 and the input/output device 810 may be utilized to display data (e.g., images and/or video data) received from the at least one pressure sensor 310 and provide (e.g., display) weight and/or volume data to assist an operator in operating the vehicle 102 and the application system 106.

The communication interface 802 can include hardware, software, or both. The communication interface 802 may provide one or more interfaces for communication (such as, for example, packet-based communication) between the central controller 218 and one or more other computing devices or networks (e.g., a server) and the at least one pressure sensor 310. As an example, and not by way of limitation, the communication interface 802 may include a network interface controller (NIC) or network adapter for communicating with an Ethernet or other wire-based network or a wireless NIC (WNIC) or wireless adapter for communicating with a wireless network, such as a WI-FI.

In some embodiments, the bus 812 (e.g., a Controller Area Network (CAN) bus) may include hardware, software, or both that couples components of central controller 218 to each other and to external components.

All references cited herein are incorporated herein in their entireties. If there is a conflict between definitions herein and in an incorporated reference, the definition herein shall control.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternate useful combinations of the elements described, will become apparent to those skilled in the art from the description. Such modifications and embodiments also fall within the scope of the appended claims and equivalents.

What is claimed is:

1. A vehicle, comprising:
a holding tank comprising a plurality of segments, each segment configured to hold an individual product;
one or more product sensors for sensing product being added to the holding tank;
a plurality of suspension assemblies supporting the vehicle;
a plurality of pressure sensors for measuring a pressure associated with each suspension assembly of the plurality of suspension assemblies; and
a volume determination system comprising:
at least one processor; and
at least one non-transitory computer-readable storage medium storing instructions thereon that, when executed by the at least one processor, cause the volume determination system to:
receive an indication from the one or more product sensors when a first segment of the plurality of segments of the holding tank is being filled with a first product via a first filling process;
responsive to an input that the first filling process of the first segment is complete, receive first pressure measurements from the plurality of pressure sensors;
based at least partially on the received first pressure measurements, determine a volume of the first product within the first segment of the plurality of segments of the holding tank; and
cause the determined volume of the first product within the first segment of the plurality of segments to be output to an operator of the vehicle.

2. The vehicle of claim 1, wherein the volume determination system further comprises instructions that, when executed by the at least one processor, cause the volume determination system to:
receive an indication from the one or more product sensors when a second segment of the plurality of segments of the holding tank is being filled with a second product via a second filling process;
responsive to an input that the second filling process of the second segment is complete, receive second pressure measurements from the plurality of pressure sensors;
based at least partially on the received second pressure measurements, determine a volume of the second product within the second segment of the plurality of segments of the holding tank; and
cause the determined volume of the second product within the second segment of the plurality of segments to be output to the operator of the vehicle.

3. The vehicle of claim 1, wherein the volume determination system further comprises instructions that, when executed by the at least one processor, cause the volume determination system to receive usage data related to an application of the first product during an application process.

4. The vehicle of claim 3, wherein receiving usage data related to the application of the first product comprises receiving data related to at least one of a time period for which the first product has been applied or an application rate at which the first product has been applied.

5. The vehicle of claim 4, wherein the volume determination system further comprises instructions that, when executed by the at least one processor, cause the volume determination system to receive third pressure measurements from the plurality of pressure sensors after the application of the first product.

6. The vehicle of claim 5, wherein the volume determination system further comprises instructions that, when executed by the at least one processor, cause the volume determination system to update the determined volume of the first product based at least partially on the received third pressure measurements and the received usage data related to the application of the first product.

7. The vehicle of claim 1, wherein the volume determination system further comprises instructions that, when executed by the at least one processor, cause the volume determination system to cause the determined volume of the first product within the first segment of the plurality of segments to be displayed on a display panel of a operator cabin.

8. The vehicle of claim 1, wherein each suspension assembly of the plurality of suspension assemblies comprises:
at least one suspension cylinder mounted between a chassis and a respective ground-engaging element of the vehicle;
a hydraulic fluid;
a pump for pressurizing the hydraulic fluid within the at least one suspension cylinder; and
at least one pressure sensor of the plurality of pressure sensors interfacing with the hydraulic fluid and operably coupled to the volume determination system.

9. The vehicle of claim 1, wherein the volume determination system further comprises instructions that, when executed by the at least one processor, cause the volume determination system to receive pressure measurements prior to the first filling process.

10. The vehicle of claim 1, wherein determining the volume of the first product within the first segment of the plurality of segments of the holding tank of the vehicle comprises determining the volume of the first product within the first segment of the holding tank of the vehicle based at least partially on a known density of the first product.

11. The vehicle of claim 1, wherein the volume determination system further comprises instructions that, when executed by the at least one processor, cause the volume determination system to adjust operation of the vehicle based at least partially on the determined volume of the first product within the first segment of the plurality of segments of the holding tank.

12. The vehicle of claim 1, wherein the volume determination system further comprises instructions that, when executed by the at least one processor, cause the volume determination system to provide volume data to a remote device.

13. The vehicle of claim 1, wherein the volume determination system further comprises instructions that, when executed by the at least one processor, cause the volume determination system to determine an area over which the first product can be applied based at least partially on the determined volume of the first product within the first segment of the plurality of segments of the holding tank.

\* \* \* \* \*